United States Patent [19]

Kanada et al.

[11] 4,390,643

[45] Jun. 28, 1983

[54] PROCESS FOR PRODUCING AMINE FORMALDEHYDE RESIN FOAM

[75] Inventors: Toshiaki Kanada, Matsudo; Kazuhiro Suzuki; Hiroshi Yoshioka, both of Tokyo; Kenji Maeda; Yoshihiro Tsurumi, both of Kanamachi, all of Japan

[73] Assignee: Mitsubishi Gas Chemical Co., Inc., Tokyo, Japan

[21] Appl. No.: 299,168

[22] Filed: Sep. 3, 1981

Related U.S. Application Data

[63] Continuation-in-part of Ser. No. 124,907, Feb. 26, 1980, abandoned.

[30] Foreign Application Priority Data

Feb. 26, 1979 [JP] Japan ................................ 54-21604
Nov. 28, 1979 [JP] Japan ............................... 54-153812
Nov. 28, 1979 [JP] Japan ............................... 54-153813

[51] Int. Cl.$^3$ ............................................. C08J 9/14
[52] U.S. Cl. .................................... 521/117; 521/131; 521/133; 521/187; 521/188
[58] Field of Search ............... 521/188, 187, 133, 117, 521/131

[56] References Cited

U.S. PATENT DOCUMENTS 2,789,095  4/1957  Lindvig ............................. 521/188
4,026,980  5/1977  Hubbard ............................ 521/188
4,192,923  3/1980  Tajkowski ......................... 521/188
4,234,698  11/1980 Inverarity et al. .................. 521/188

FOREIGN PATENT DOCUMENTS 2214722  1/1974  France .

Primary Examiner—Morton Foelak
Attorney, Agent, or Firm—Browdy & Neimark

[57] ABSTRACT

A process for producing amine formaldehyde resin foam by using a precondensate for the amine formaldehyde resin, a foaming agent, a surfactant and a curing agent is disclosed. Said process is characterized in that the foaming agent is selected from the group consisting of aliphatic hydrocarbons or halogenated aliphatic hydrocarbons having a boiling point in the range of from about $-30°$ C. to about 30° C., the foaming agent is used in amount of from about 0.07 mol to about 1.0 mol per 100 gr. of solid content of the precondensate for resin (residue obtained by heating the precondensate in accordance with JIS K 5400 8.2.1.), the process comprising mixing the precondensate, the foaming agent and the surfactant, emulsifying the resulting mixture at a specified pressure at a temperature of at least 0° C. and higher than the boiling point of the foaming agent by 5°–50° C., and while or after mixing the curing agent with the mixture, foaming the mixture at a specified temperature and pressure.

10 Claims, No Drawings

PROCESS FOR PRODUCING AMINE FORMALDEHYDE RESIN FOAM

CROSS-REFERENCE TO RELATED APPLICATION

This application is a continuation-in-part of application Ser. No. 124,907 filed on Feb. 26, 1980, now abandoned.

BACKGROUND OF THE INVENTION

This invention relates to an improved process for producing amine formaldehyde resin foam, characterized by using an organic compound having a low boiling point, and particularly relates to a process for producing amine formaldehyde resin foam having good mold-filling property, uniform cell structure and low density and which is easily dried.

Amine formaldehyde resin foam is cheap, makes an excellent heat shield, absorbs sound and is self-extinguishing. The resin foam is utilized as a heat insulating material for housing, a heat insulating material for low temperature storage, a sound insulating material, and decorative material. Amine formaldehyde resin foam having water absorbing property is used for agriculture.

Organic foams are being used in a variety of fields, and their production increases annually. Therefore, it is necessary that the organic foams have fire resistance and be easily disposed as a waste material.

Amine formaldehyde resin foams are self extinguishing and are biologically degradable. So, the resin foams satisfy the requirements as mentioned above.

Many processes for producing amine formaldehyde resin foam are well known. However, the only process carried out on a commercial scale is the process comprising mixing an aqueous solution of a precondensate for urea resin with an aqueous solution of a foaming agent and a curing agent while blowing air into the solution to foam the mixture, and curing the foam. However, in effecting the foaming-operation according to this process, the weight of the water used is 3 to 6 times that of the solid content of the precondensate, so the resulting foam contains a large amount of water. The water must be removed from the foam through drying, and it takes 4 to 7 days to remove such water from the foam through natural drying. This is a disadvantage in using the foam in housing.

Two processes for producing amine formaldehyde resin foam using an organic compound having a low boiling point are known in the art: one comprises mixing an aqueous precondensate for the resin solution, a foaming agent and a surfactant at a temperature less than the boiling point of the foaming agent and emulsifying the mixture and adding a curing agent to the mixture and then charging the mixture into a mold and foaming it by heating it at a temperature above the boiling point of the foaming agent. The other comprises foaming a highly viscous precondensate for the resin by vaporizing a foaming agent through heat of neutralization. [Refer to Japanese Patent Publication (Kokai) No. 40669/1975)]

In the former process, good foam can be obtained only when the foaming and curing operations have been effected very slowly. The foaming operation takes a long time. The emulsification is difficult in case of using a foaming agent having a low boiling point, and much foaming agent is lost.

In the latter process, an excess of an acid and a base is required. The salt obtained through neutralization has anti-foaming action and the acid catalyst employed not only promotes curing reaction, but also participates in the neutralization reaction. So, it is difficult to decide how much acid to use.

The above shortcomings in the processes for producing amine formaldehyde resin foam are derived from the following properties of the amine formaldehyde resin:

(1) The precondensate for amine formaldehyde resin is hydrophilic and is incompatible with a foaming agent composed of an organic compound having a low boiling point, the precondensate and the foaming agent are hard to mix with each other.

(2) The curing reaction of the amine formaldehyde resin is slow. So, it is difficult to maintain good balance between foaming and curing, and degassing of the foaming agent is likely to occur.

(3) The precondensate for amine formaldehyde resin generates little heat when being cured. The precondensate causes curing reaction as well as decomposing reaction at a high temperature.

SUMMARY OF THE INVENTION

The present inventors have carried out research to find a process for producing amine formaldehyde resin foam having low density and capable of being dried rapidly and not having the above mentioned shortcomings. As a result, we found the present invention which satisfies the above requirements.

One object of this invention is to provide a process for producing amine formaldehyde resin foam having uniform cell structure and low density and which is capable of being dried rapidly.

Another object of this invention is to provide a process for producing amine formaldehyde resin foam suitable for use in housing.

This invention relates to a process for producing an amine formaldehyde resin foam by using a precondensate for the resin, a foaming agent, a surfactant and a curing agent, characterized in that the foaming agent is selected from the group consisting of an aliphatic hydrocarbon or a halogenated aliphatic hydrocarbon having a boiling point in the range of from about $-30°$ C. to about $30°$ C., and the foaming agent being used in amount of from about 0.07 mol to about 1.0 mol per 100 g of solid content of the precondensate for the amine formaldehyde resin, the process comprising mixing the precondensate, the foaming agent and the surfactant under such conditions that the foaming agent is maintained liquid, emulsifying the resulting mixture at a temperature which is at least $0°$ C. and higher than the boiling point of the foaming agent by $5°-50°$ C. and at such a pressure that the foaming agent is maintained liquid at said temperature, while or after mixing the resulting emulsified mixture with the curing agent, transferring the resulting mixture to an environment having atmospheric pressure or depressurizing the mixture to atmospheric pressure at a temperature which is between $0°$ and $35°$ C. and higher than the boiling point of the foaming agent to foam the mixture.

DETAILED DESCRIPTION OF THE INVENTION

The term "precondensate for amine formaldehyde resin" employed in the specification and claim means reaction products of amino compounds, such as urea, melamine, guanamine, benzoguanamine, or biuret and aldehydes, such as formaldehyde. The precondensates may be modified with alcohols, polyvalent alcohols, polysaccharides, phenol, cresol, dicyandiamine, polyamine, polyisocyante, furfural, aniline, or the like. The precondensate for the resin may be used in water or a mixed solution of water and glycol. The solid content of the precondensate is measured as a residue obtained by heating it in accordance with JIS K 5400 8.2.1., and the concentration of the solid content may be in the range of from about 35% to 90% by weight, preferably from about 45% to about 80% by weight. The viscosity of the precondensate may be in the range of from about 5 to 5000 centipoise at 25° C., preferably from about 20 to about 3000 centipoise. When the concentration of the solid content of the precondensate is less than 35% by weight, it takes a long time to dry the resin foam made from the precondensate. When the concentration is more than 90% by weight, the precondensate is too viscous to mix with a foaming agent and a curing agent.

Foaming agents employed in the practice of this invention include aliphatic hydrocarbons or halogenated aliphatic hydrocarbons having a boiling point of from $-30°$ C. to 30° C. Examples of the foaming agents include n-butane, isobutane, 1-butene, 2-butene, isobutylene, butadiene, neopentene, dichlorodifluoro methane, dichlorofluoro methane, 1,2-dichlorotetrafluoro ethane, trichlorofluoro methane, chloromethane, chloroethane, vinyl chloride and the like. L.P.G. which is liquefied gas composed of mixture of aliphatic hydrocarbons, dichlorodifluoro methane, 1,2-dichlorotetrafluoro ethane and mixtures thereof is particularly preferred. When a foaming agent having a boiling point below than $-30°$ C. is used, vaporization of the foaming agent through depressurization occurs rapidly, and the balance between foaming and curing is lost, so degassing from the foam and shrinkage of the foam tends to occur. In addition, as soon as the raw material for the foam is charged into a mold, foaming occurs. So, mold-filling property is poor. When a foaming agent having a boiling point of more than 30° C. is used, the raw material for the foam must be heated to cause foaming of the material. This causes decomposition of the amine formaldehyde resin, so degassing and shrinkage are likely to occur through breakage of the cells.

The surfactant of this invention acts as an emulsifying agent for uniformly mixing a foaming agent and a solution of a precondensate for amine formaldehyde resin and keeps cells from breaking while the resulting foam is cured. Compounds functioning as mentioned above are usable as a surfactant of this invention. Examples of the surfactants include alkylbenzene sulfonates, alkylalcohol sulfates, aliphatic acid salts, polyoxyethylene alkylether sulfates and the like. The amount of surfactant employed may be in the range of from about 0.03 parts to about 7 parts per 100 parts of solid content of the precondensate, preferably from about 0.1 to 3 parts.

The curing agent of this invention means any of the conventional acid catalysts employed for curing an amine formaldehyde resin. Examples of the curing agents include water, glycol or glycerine solutions of sulfuric acid, phosphoric acid, aromatic sulfonic acids, sulfamic acid, oxalic acid, malonic acid, and the like. The amount of curing agent employed is in the range of from about 0.05 parts to about 20 parts per 100 parts of solid content of the precondensate, preferably from about 0.5 parts to about 15 parts. The curing agent is added to the reaction system so as to provide a solution having a pH of from about 0.5 to 5.0, preferably from about 1.0 to about 4.0.

Aromatic sulfonic acids are preferred as a curing agent. When aromatic sulfonic acids are used as a curing agent, the following advantages can be achieved:

(1) The aromatic sulfonic acids have little corrosive action on the metal.

(2) Little or no free acid is generated under the moist and hot conditions, so the object product, the foam, is neither powdered nor degraded.

(3) Since the aromatic sulfonic acid reacts with free formaldehyde and amine formaldehyde resin during curing, little free formaldehyde is generated during drying and curing. So, there is little formaldehyde smell during drying and curing. The product of the reaction of aromatic sulfonic acid with free formaldehyde or amine formaldehyde resin is incorporated in the resulting amine formaldehyde resin.

Any of the aromatic sulfonic acids capable of reacting with formaldehyde is usable as a curing agent in this invention. Examples of the aromatic sulfonic acids include phenolsulfonic acid, benzenesulfonic acid, xylenesulfonic acid, toluenesulfonic acid, sulfobenzoic acid, sulfosalicylic acid and mixtures thereof. Phenolsulfonic acid, toluenesulfonic acid and mixtures thereof are most preferably.

It is critical to emulsify the precondensate for the resin, forming agent and surfactant in the present invention. Emulsification is necessary for obtaining a foamed uniform cell structure and for enhancing effectiveness of the foaming agent. Before being mixed with a curing agent, it is critical that the emulsion be maintained under a pressure above 1 atm, at a temperature of at least 0° C. and higher than the boiling point of the foaming agent by 5°–50° C. When the emulsion is maintained at a temperature below 0° C., the viscosity of the emulsion becomes high, and solubility of the surfactant in the solution decreases, so, the mixture is not sufficiently emulsified.

When the temperature of the emulsion is too high, the pressure of the mixture becomes higher. So, it is necessary to lower the temperature of the liquid mixture in order to foam the mixture and cure the resulting foam. This is not desirable.

The emulsion is transfered to an environment having atmospheric pressure or depressurized to atmospheric pressure at a temperature in the range of from about 0° to about 35° C. and at a temperature higher than the boiling point of the foaming agent, after or during mixing the emulsion with the curing agent. When the foaming operation is effected at a temperature below 0° C., flowability of the emulsion to be foamed and force for keeping the cells by the surfactant become insufficient. When the foaming operation is effected at a temperature above 35° C., the foaming agent is lost and the resulting amine formaldehyde resin is decomposed.

When the foaming and curing operation are effected at a temperature below the boiling point of the foaming agent, the foaming speed is slow and the resulting foam is likely to shrink.

In practicing this invention, the apparatus used is one capable of carrying out the step of mixing a solution of a precondensate for the resin, a foaming agent and a surfactant with stirring to obtain a stable emulsion and the step of uniformly mixing the resulting emulsion with a curing agent at a pressure above 1 atm. and the step of charging the mixture into a mold.

The emulsification of the mixture can be continuous or discontinuously effected by a well known process, such as high-speed mixer, homogenizer, colloid mill and the like.

It is preferable to mix the emulsion with a curing agent and charge in a mold the mixture in a continuous way. The mixing operation may be effected in a state of solution at a pressure above 1 atm. Alternatively, transferring or depressurization of the emulsion for forming cells and mixing with the curing agent may be effected simultaneously. The above operation may be carried out by means of forced stirring apparatus, motionless fluid mixer, superpressurized liquid jet mixing, spray mixing, mixing agitation by introducing pressurized air and the like. It is preferable that the mixing operation be thoroughly effected to form a uniform mixture.

In the present invention a compound represented by the formula;

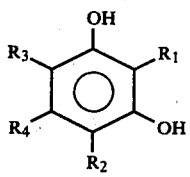

I wherein $R_1$, $R_2$ and $R_3$ are independently selected from the group consisting of hydrogen and alkyl having 1–3 carbon atoms, and $R_4$ is selected from the group consisting of hydroxyl, hydrogen and alkyl having 1–3 carbon atoms or a condensate of the compound and formaldehyde may be added to the reaction system in order to further improve the properties of the resulting foam.

Examples of the compound represented by the formula I include resorcinol; pyrogallol; alkyl-substituted resorcinols, such as 5-methyl resorcinol, 5-ethyl resorcinol, 5-propyl resorcinol, 5-n-butyl resorcinol, 4,5-dimethyl resorcinol, 2,5-dimethyl resorcinol, 4,5-diethyl resorcinol, 2,5-diethyl resorcinol, 4,5-dipropyl resorcinol, 2,5-dipropyl resorcinol, 4-methyl-5-ethyl resorcinol, 2-methyl-5-ethyl resorcinol, 2,4,5-trimethyl resorcinol or 2,4,5-triethyl resorcinol, and mixtures thereof. A mixture of the compound and a phenol may be used. Resorcinol, oil shale resorcinol, namely mixture of alkyl-substituted resorcinols obtained by dry-distilling oil shale or mixture of resorcinol and oil shale resorcinol are preferable from the point of view of economy. A mixture of the compound and a condensate of the compound and formaldehyde may be used in the present invention.

At least one modifier selected from the group consisting of the compounds represented by formula I, mixtures thereof, condensates of the compounds and formaldehyde, and mixtures of the compounds and the condensates may be used in a state of solution selected from the group consisting of water, glycol, glycerin and mixtures thereof.

The modifier or modifiers may be added to the system when the precondensate for amine formaldehyde resin, the foaming agent and the surfactant are mixed and emulsified. The modifier or modifiers may be added to a mixture of the emulsion and the curing agent. The modifier or modifiers may be previously added to the precondensate, or the curing agent.

The amount of modifier used may be in the range of from about 5 to about 40 parts by weight per 100 parts of solid content of the precondensate, preferably in the range of from about 10 to about 35 parts by weight.

Addition of the modifier in an amount of less than 5 parts by weight per 100 parts of solid content of the precondensate is too small to exhibit effectiveness of the modifier. When the amount of modifier used is more than 40 parts by weight per 100 parts of solid content of the precondensate, the effectiveness derived from addition of the modifier does not increase in proportion to amount of the modifier added. Too much modifier lowers the strength of the amine formaldehyde resin, because unreacted modifier remains in the amine formaldehyde resin.

The following advantages can be achieved by adding the resorcinol compound to the reaction system:

(a) Primary shrinkage of the resin is small.
(b) The resulting resin has resistance to climatic conditions and is neither powdered nor degraded for a long time.
(c) Foaming having very low density of less than 15 $Kg/m^3$ can be produced.
(d) The resulting resin foam has great strength.

This invention is further illustrated by the non-limiting following preparation Example, Working Examples and Comparative Examples.

The part and percent is by weight unless otherwise specified.

PREPARATION 1

Into a reaction kettle were charged 700 parts of urea, 1900 parts of formalin (a 37% formaldehyde solution), 380 parts of diethylene glycol, and 500 parts of water. To the mixture was added 20 parts of hexamethylene tetramine as a catalyst. The reaction was effected at 98° C. for 12 hours with stirring, and thereafter 240 parts of urea was added to the reaction mixture, and sodium hydroxide was added to the mixture to neutralize it. The resulting solution of precondensate for amine formaldehyde resin was cooled and had a solid content of 50% and a viscosity of about 40 cps (25° C.). The solution was called Solution A.

Solution A was concentrated by distilling it under a reduced pressure. The resulting solution had a solid content of 72% and a viscosity of 1100 cps at 25° C. and was called Solution B.

Solution B was spray-dried at a reduced pressure to obtain a flake-like solid (called Solid C).

PREPARATION 2

Into a reaction kettle were charged 700 parts of urea, 1900 parts of formalin (a 37% formaldehyde solution), 300 parts of glycerin, and 500 parts of water. To the mixture was added 20 parts of hexamethylene tetramine as a catalyst. The reaction was effected at 100° C. for 12 hours with stirring and then cooled to 60° C. The reaction mixture was adjusted to pH of 8.5 by adding thereto sodium hydroxide. To the mixture was added 200 parts of melamine. The reaction was effected for 15 minutes. Sodium hydroxide was added to the reaction mixture to neutralize it. The resulting solution of precondensate for amine formaldehyde resin was cooled and had a solid content of 55% and viscosity of 2100 cps at 25° C.

WORKING EXAMPLES 1–5 AND COMPARATIVE EXAMPLES 1–3

A mixture having the following components (the amounts are per 100 parts by weight of solid content of precondensate) was charged into a corrugated box to foam it:

| | |
|---|---|
| Solution A obtained in Preparation 1 | 100 parts |
| a 20% aqueous solution of sodium dodecylbenzene sulfonic acid | 2 |
| a 85% aqueous solution of phosphoric acid | 5 |
| a foaming agent as given in Table 1 | Amount is given in Table 1 |

The result is shown in Table 1.

In all the Working Examples and in Comparative Example 3, the precondensate for amine formaldehyde resin was mixed with the surfactant and the foaming agent and emulsified at such conditions that the foaming agent is kept liquid. Thereafter, the emulsion was continuously mixed with the curing agent by mechanical mixing. The emulsion was transferred to an environment having atmospheric pressure to foam and cure it.

In Comparative Examples 1 and 2, the precondensate for amine formaldehyde resin was mixed with the surfactant and the foaming agent and was emulsified at a temperature of less than the boiling point of the foaming agent and at one atmospheric pressure. The resulting emulsion was mixed with the curing agent at one atmospheric pressure by mechanical mixing and was foamed and cured.

Time for surface hardening means time required for the surface of resin foam to become no longer tacky to a finger.

Mold-filling property is measured as good—when the emulsion fills all the corners of a mold bad—when the emulsion does not reach well into all the corners of a mold.

Efficiency (%) of foaming agent is shown by the following equation:

$$\text{Efficiency (\%)} = \frac{\text{wt. of solid component in resin (g)} + \text{wt. of curing agent (g)} + \text{wt. of surfactant (g)}}{\text{mol of foaming agent} \times 22.41 \times \text{density of the resulting foam (g/l)}} \times 100$$

Drying time means time required until water content of the foam amounts to less than 0.5% by volume.

TABLE 1

| | | | Working Example | | | | | Comparative Example | | |
|---|---|---|---|---|---|---|---|---|---|---|
| | | b.p. (°C.) | 1 | 2 | 3 | 4 | 5 | 1 | 2 | 3 |
| Foaming agent (mol/100g of precondensate) | n-pentane | 36 | | | | | | 0.1944 | | |
| | n-butane | −0.5 | 0.190 | 0.121 | | | | | | |
| | propane | −42.1 | | | | | | | | 0.2272 |
| | trichlorofluoromethane | 23.7 | | | | | | | 0.1965 | |
| | 1,2-dichlorotetrafluoroethane | 3.8 | | 0.0585 | 0.1755 | 0.111 | | | | |
| | dichlorodifluoromethane | −29.8 | | | | 0.066 | 0.190 | | | |
| Temperature at which the foam cures (°C.) | | | 18 | 18 | 18 | 18 | 18 | 18 | 18 | 18 |
| Time required until foaming is completed (min.) | | | <1 | 1 | 3 | 2 | <1 | — | 80 | <<1 |
| Time for surface hardening (min.) | | | 3 | 4 | 4 | 3 | 3 | 15 | 8 | 3 |
| Mold-filling property | | | good | good | good | good | good | — | bad | bad |
| Compression strength (kg/cm$^2$) | after 3 hours | | 0.1 | 0.1 | 0.1 | 0.1 | 0.1 | — | — | — |
| | after 24 hours | | 0.2 | 0.2 | 0.2 | 0.2 | 0.2 | — | 1.7 | 0.2 |
| Density (Kg/m$^3$) | | | 16 | 17 | 16 | 18 | 20 | — | 130 | 40 |
| Efficiency of foaming agent (%) | | | 80 | 79 | 87 | 76 | 64 | — | 8 | 27 |
| Drying time (day) | | | <0.5 | <0.5 | <0.5 | <0.5 | <0.5 | — | 2 | 1 |
| State of the resulting foam | | | good | good | good | good | good | * | * | ** |

*Little foaming occurs.
**Foam has many voids.

As is apparent from Table 1, in Working Examples 1–5, foaming and curing steps were rapid. Loss by vaporization of the foaming agent outside the foam is small, and a foamed uniform cell structure having low density was obtained.

In Comparative Examples 1 and 2, little foaming occurs, or foaming occurs very slowly. In addition, efficiency of the foaming agent is low, so density of the resulting foam is higher than that of the foams obtained in Working Examples.

In Comparative Example 3, the foaming speed is too rapid. So, as soon as foaming occurs, degassing and shrinkage of the foam are likely to occur. The resulting foam has nonuniform cells. Since foaming is rapid, mold-filling property is poor.

WORKING EXAMPLES 6–10 AND COMPARATIVE EXAMPLES 4–8

100 Parts of precondensate for amine formaldehyde resin (Solution B obtained in Preparation 1), 2 parts of 20% aqueous solution of sodium laurylsulfate as a surfactant, 10 parts of a 15% aqueous solution of sulfamic acid as a curing agent and a foaming agent as given in Table 2 were used. Foam was prepared from these components under conditions as given in Table 2. In all the Examples, the solution of precondensate for amine formaldehyde resin, the surfactant and the foaming agent were blended and emulsified. Thereafter the resulting emulsion was blended with the curing and was transferred to an environment having atmospheric pressure to foam the mixture under a pressure above 1 atm.

emulsification was effected under a pressure above 1 atm.

The precondensate for amino resin in Working Ex-

TABLE 2

|  |  | C.E. 4 | W.E. 6 | W.E. 7 | W.E. 8 | C.E. 5 | C.E. 6 | W.E. 9 | C.E. 7 | W.E. 10 | C.E. 8 |
|---|---|---|---|---|---|---|---|---|---|---|---|
| Foaming agent (mol/100 gr. of precondensate) | dichlorodifluoro methane | 0.190 | 0.190 | 0.190 | 0.190 | 0.190 |  |  |  |  |  |
|  | trichlorofluoro methane |  |  |  |  |  | 0.189 | 0.189 | 0.189 | 0.189 | 0.189 |
| Emulsification temperature (°C.) |  | −5 | 0 | 10 | 20 | 30 | 25 | 30 | 30 | 35 | 45 |
| Temperature at which the foam cures (°C.) |  | −5 | 0 | 10 | 20 | 30 | 30 | 30 | 20 | 35 | 45 |
| Time required until foaming is completed (min.) |  | 7 | 3 | 2 | <1 | <<1 | 45 | 20 | 30 | 7 | 3 |
| Time for surface hardening (min.) |  | 20 | 6 | 4 | 3 | 2 | 5 | 4 | 7 | 3 | 2 |
| Mold-filling property |  | bad | good | good | good | bad | bad | good | good | good | bad |
| Compression strength (Kg/cm²) | after 3 hours | — | — | 0.1 | 0.1 | 0.1 | 0.2 | 0.1 | 0.1 | 0.1 | 0.1 |
|  | after one day | 0.2 | 0.3 | 0.2 | 0.2 | 0.2 | 0.5 | 0.3 | 0.4 | 0.2 | 0.2 |
| Density (Kg/m³) |  | 45 | 26 | 22 | 25 | 39 | 70 | 31 | 50 | 29 | 45 |
| Efficiency of foaming agent (%) |  | 39 | 67 | 79 | 69 | 44 | 25 | 56 | 35 | 60 | 39 |
| Drying time (day) |  | — | <2 | <1 | <0.5 | <0.5 | <0.5 | <0.5 | <1 | 0.5 | 0.5 |
| State of the resulting foam |  | curing slow *1 | uniform good | uniform good | uniform good | foaming rapid *2 | foaming slow *3 | fairly good | shrinkage large *4 | fairly good | degassing large *5 |

C.E. Comparative Example
W.E. Working Example
Note:
*1 Flowability of solution for charging is poor and curing and drying is slow.
*2 As soon as solution is charged into a mold, foaming has been completed. Mold-filling property was poor. Degassing occurred. Non-uniform cells were formed.
*3 Foaming is slow. Curing occurred before foaming agent vaporizes. So, density of the resulting foam is high.
*4 Foaming and curing were effected simultaneously. So, the resulting foam had high density and was non-uniform.
*5 After foaming, violent degassing occurred. The foam shrank. Density of the foam was high, and the cells of the foam were non-uniform.

As is apparent from Table 2, good foams can be produced under the following conditions:
(a) Temperature of the emulsion is higher than 0° C. and higher than the boiling point of the foaming agent by 5°–50° C., and
(b) Temperature at which the foam cures is in the range of from 0° to 35° C. and higher than the boiling point of the foaming agent.

WORKING EXAMPLES 11–16

Each foam was prepared using components as given in Table 3 under conditions as given in Table 3. The amples 12 was the one obtained by adding water to Solution C of Preparation 1 so as to provide a solution having a solid content of 60%.

COMPARATIVE EXAMPLES 12–15

Each foam was prepared using components as given in Table 4 under conditions as given in Table 4. The emulsification was effected at one atmospheric pressure. In the above Examples, little foaming occurred, or the foaming was slowly effected. Therefore, the above processes were not useful.

TABLE 3

|  |  | Example |  |  |  |  |  |  |
|---|---|---|---|---|---|---|---|---|
|  |  | 11 | 12 | 13 | 14 | 15 | 16 | 16' |
| Precondensate for amine resin (Preparation) |  | 1-A | 1-B | 1-C | 2 | 1-B | 1-B | 1-B |
| Surfactant (part/100 parts by weight of precondensate) | 20% aqueous solution of sodium dodecyl benzenesulfonate |  | 2 |  | 2 |  |  |  |
|  | 20% aqueous solution of sodium lauryl sulfate | 1 |  | 2 |  | 2 | 2 | 2 |
|  | 20% aqueous solution of sodium laurate | 1 |  |  |  |  |  |  |
| Curing agent (part/100 parts by weight of precondensate) | 85% aqueous solution of phosphoric acid |  | 8 |  | 8 |  |  | 5 |
|  | 15% aqueous solution of sulfamic acid |  |  | 7 |  | 8 | 8 |  |
|  | 50% aqueous solution of p-toluenesulfonic acid | 4 |  |  |  |  |  |  |
| Foaming agent (mol/100 gr. of precondensate) | n-butane | 0.207 | 0.172 | 0.086 |  |  |  |  |
|  | propane |  | 0.034 |  |  |  |  |  |
|  | 1,2-dichloro tetrafluoro ethane |  |  | 0.117 | 0.117 | 0.293 | 0.088 | 0.205 |
|  | trichlorofluoro |  |  |  | 0.036 |  |  |  |

TABLE 3-continued

|  | | Example | | | | | |
| --- | --- | --- | --- | --- | --- | --- | --- |
|  | | 11 | 12 | 13 | 14 | 15 | 16 | 16' |
| densate) methane | | | | | | | | |
| Emulsification temperature (°C.) | | 20 | 20 | 18 | 25 | 30 | 15 | 20 |
| Temperature at which the foam cures (°C.) | | 20 | 20 | 18 | 25 | 25 | 20 | 25 |
| Time required until foaming is completed (min.) | | 1 | <1 | 2 | 5 | 3 | <1 | 2 |
| Time for surface hardening (min.) | | 3 | 4 | 4 | 6 | 5 | 5 | 7 |
| Mold-filling property | | good | good | good | good | good | good | good |
| Compression after 3 hours | | 0.1 | 0.1 | 0.1 | 0.1 | 0.05 | 0.2 | 0.1 |
| strength after 1 day ($Kg/cm^2$) | | 0.1 | 0.2 | 0.2 | 0.2 | 0.1 | 0.8 | 0.2 |
| Density ($Kg/m^3$) | | 14 | 25 | 22 | 26 | 17 | 45 | 21 |
| Efficiency of foaming agent (%) | | 80 | 68 | 61 | 70 | 66 | 83 | 80 |
| Drying time (day) | | <0.5 | <0.5 | <0.5 | <0.5 | <0.5 | <1 | <0.5 |
| State of the resulting foam | | Uniform, good | | | | | | |

TABLE 4

|  | | Comparative Example | | | |
| --- | --- | --- | --- | --- | --- |
|  | | 12 | 13 | 14 | 15 |
| Precondensate for amino resin (Preparation) | | 1-A | 1-B | 1-B | 1-B |
| Surfactant (part/100 parts by weight of precondensate) | 20% aqueous solution of sodium dodecyl benzenesulfonate | | 2 | 2 | |
| | 20% aqueous solution of sodium lauryl sulfate | 2 | | | 2 |
| Curing agent (part/100 parts by weight of precondensate) | 85% aqueous solution of phosphoric acid | | | 7 | 5 |
| | 15% aqueous solution of sulfamic acid | | 7 | | |
| | 50% aqueous solution of p-toluenesulfonic acid | 3 | | | |
| Foaming agent (mol/100 grs. of precondensate) | n-heptane | 0.186 | 0.058 | | |
| | 1,2-dichlorotetrafluoro ethane | | | | 0.205 |
| | trichlorofluoro methane | | 0.146 | 0.204 | |
| Emulsification temperature (°C.) | | 30 | 20 | 20 | 0 |
| Temperature at which the foam cures (°C.) | | 30 | 25 | 35 | 25 |
| Time required until foaming is completed (min.) | | — | 80 | 70 | 60 |
| Time for surface hardening (min.) | | 10 | 13 | 8 | 20 |
| Mold-filling property | | — | — | bad | bad |
| Compression after 3 hours | | — | — | — | — |
| strength after 1 day ($Kg/cm^2$) | | — | — | 1.3 | 0.2 |
| Density ($Kg/m^3$) | | — | 250 | 80 | 35 |
| Efficiency of foaming agent (%) | | — | 6 | 21 | 48 |
| Drying time (day) | | — | 4.5 | <3 | <2 |
| State of the resulting foam | | Slight foaming | Foaming occurred slowly. Density of foam is high. | Foaming occurred gently. Density of foam is high. | Foaming occurred gently. |

PREPARATION 3

Into a reaction kettle were charged 720 parts of urea, 1950 parts of formalin (a 37% formaldehyde solution), 380 parts of diethylene glycol, and 480 parts of water. To the mixture was added 22 parts of hexamethylene tetramine as a catalyst. The reaction was effected at 98° C. for 7 hours with stirring, and thereafter 240 parts of urea was added to the reaction mixture. Sodium hydroxide was added thereto to neutralize it. Then the resulting solution of precondensate for resin was cooled. It had a solid content of 49% and a viscosity of 40 cps at (25° C.). The solution was concentrated by distilling it under a reduced pressure. The resulting solution had a solid content of 60% and a viscosity of 150 cps at 25° C.

PREPARATION 4

Into a reaction kettle were charged 720 parts of urea, 1950 parts of formalin, 300 parts of glycerin and 480 parts of water. To the mixture was added 22 parts of hexamethylene tetramine as a catalyst. The reaction was effected at 98° C. for 7 hours with stirring, and cooled to 60° C. The pH of the resulting mixture was adjusted to 8.5 by adding sodium hydroxide. Then, 200 parts of melamine was added to the mixture, and reaction was effected for 15 minutes. NaOH was added to the reaction mixture to neutralize it. The resulting reaction product solution was cooled and then concentrated by distilling it under a reduced pressure. The resulting solution of precondensate for resin had solid content of 55% and viscosity of 2100 cps (25° C.).

WORKING EXAMPLES 17-22 AND COMPARATIVE EXAMPLES 16-21

167 parts of the solution of precondensate of Preparation 3, (100 parts of solid content of precondensate), 4 parts of a 20% aqueous solution of sodium lauryl sulfate and each foaming agent as given in Table 5 in amounts as given in Table 5 was emulsified under a pressure above 1 atm. Each of the resulting emulsions was continuously blended by a mechanical means with an aromatic sulfonic acid (curing agent) in amount as given in Table 5. The resulting solution was depressurized at a foaming temperature as given in Table 5 and charged into a film-clad corrugated box to foam and be cured.

In the Comparative Examples as given in Table 6, the Working Examples was repeated except that a mineral acid or an organic acid was used as a curing agent in place of the aromatic sulfonic acid.

The results are shown in Table 5 and 6. The amount of the foaming agent used is per 100 parts of solid content in the precondensate for amino resin.

The amount of free formalin in the foam was measured one day after foaming by a gas indicator of Kitagawa-type manufactured by Komei Science and Chemical Industries Co., Ltd.

A test for corrosive effect of foam on metal was conducted as follows. A 30×50×1 mm soft steel plate weighing 11.3 gr. was sandwiched between two 60×40×50 mm foams, and was left to stand at 35° C. at relative humidity of 90% for 12 days. The increase in the weight of metal plate was measured, and the both surfaces of the metal plate were checked for rust.

TABLE 5

| | | Working Example | | | | | |
|---|---|---|---|---|---|---|---|
| | | 17 | 18 | 19 | 20 | 21 | 22 |
| Curing agent | Kind | benzene-sulfonic acid (conc. of 30%) | p-phenol-sulfonic acid (conc. of 30%) | p-phenol-sulfonic acid (conc. of 30%) | p-toluene-sulfonic acid (conc. of 30%) | p-toluene-sulfonic acid (conc. of 30%) | sulfo-salicylic acid (conc. of 30%) |
| | Amount of curing agent per 100 parts of solid content of precondensate (part) | 8.5 | 8.5 | 17 | 8.5 | 17 | 17 |
| Foaming agent | Kind | n-butane | 1,2-dichloro-tetrafluoro ethane | dichloro-difluoro-ethane | 1,2-dichloro-tetrafluoro ethane | 1,2-dichloro-tetrafluoro ethane | trichloro-fluoro methane |
| | Amount of foaming agent per 100 grs. of solid content of precondensate (mol) | 0.20 | 0.29 | 0.19 | 0.25 | 0.25 | 0.14 |
| Temperature at which foam cures (°C.) | | 15 | 18 | 10 | 18 | 18 | 30 |
| Time for surface-hardening (min.) | | 5 | 4 | 3 | 4 | 3 | 3 |
| Density of foam (Kg/m³) | | 24 | 16 | 24 | 18 | 19 | 35 |
| Compression strength of foam (Kg/cm²) | | 0.32 | 0.13 | 0.34 | 0.21 | 0.22 | 0.60 |
| When foam was left to stand at relative humidity of 80% at 60° C. for 7 days | State of foam | good | good | good | good | good | good |
| | Rate of linear shrinkage (%) | 6 | 6 | 8 | 6 | 7 | 5 |
| Amount of free formalin in foam (ppm) | | 38 | 26 | 38 | 34 | 37 | 40 |
| Increase in weight of metal plate (mg) | | 3 | 2 | 4 | 3 | 4 | 5 |
| Degree of rust | | Slight rust | | | | | |

TABLE 6

| | | Comparative Example | | | | | |
|---|---|---|---|---|---|---|---|
| | | 16 | 17 | 18 | 19 | 20 | 21 |
| Curing agent | Kind | sulfuric acid (conc. of 15%) | oxalic acid (conc. of 12%) | oxalic acid (conc. of 12%) | phosphoric acid (conc. of 85%) | phosphoric acid (conc. of 85%) | maleic acid (conc. of 50%) |
| | Amount of | 8.5 | 35 | 50 | 8.5 | 17 | 35 |

TABLE 6-continued

| | | Comparative Example | | | | | |
|---|---|---|---|---|---|---|---|
| | | 16 | 17 | 18 | 19 | 20 | 21 |
| | curing agent per 100 parts of solid content of precondensate (part) | | | | | | |
| Foaming agent | Kind | n-butane | 1,2-dichloro-tetrafluoro ethane | dichloro-difluoro ethane | 1,2-dichloro-tetrafluoro ethane | 1,2-dichloro-tetrafluoro ethane | trichloro-fluoro methane |
| | Amount of foaming agent per 100 grs. of solid content of precondensate (mol) | 0.20 | 0.29 | 0.19 | 0.25 | 0.25 | 0.14 |
| Temperature at which foam cures (°C.) | | 15 | 18 | 10 | 18 | 18 | 30 |
| Time for surface-hardening (min.) | | 4 | 4 | 3 | 4 | 3 | 3 |
| Density of foam (Kg/m³) | | 25 | 16 | 24 | 18 | 19 | 36 |
| Compression strength of foam (Kg/cm²) | | 0.29 | 0.12 | 0.30 | 0.20 | 0.18 | 0.54 |
| When foam was left to stand at relative humidity of 80% at 60° C. for 7 days | State of foam | | | powdered and degraded | | | |
| | Rate of linear shrinkage (%) | 32 | 20 | 23 | 21 | 25 | 19 |
| Amount of free formalin in foam (ppm) | | 67 | 54 | 65 | 56 | 58 | 71 |
| Increase in weight of metal plate (mg) | | 20 | 10 | 13 | 11 | 18 | 13 |
| Degree of rusting | | heavy rust in whole surface | rust in whole surface | rust in whole surface | rust in whole surface | heavy rust in whole surface | rust in whole surface |

WORKING EXAMPLE 23 AND COMPARATIVE EXAMPLE 22

182 parts of solution of precondensate of Preparation 4 (100 parts of solid content), 4 parts of a 20% aqueous solution of sodium dodecylbenzene sulfonate and 0.25 mol of 1,2-dichlorotetrafluoro ethane were blended and emulsified under a pressure above 1 atm at 18° C. The resulting emulsion was continuously blended with 8.5 parts of a 30% aqueous solution of p-phenolsulfonic acid by a mechanical means. The mixture was charged into a film-clad corrugated box having one atmospheric pressure to foam it and cure it. The results are shown in Table 7.

The procedure of the above Working Example was repeated except that an 85% aqueous solution of phosphoric acid was used as a curing agent in place of p-phenolsulfonic acid. The results are shown as Comparative Example 22 in Table 7.

TABLE 7

| | | Working Example 23 | Comparative Example 22 |
|---|---|---|---|
| Curing agent | Kind | p-phenolsulfonic acid (conc. of 30%) | phosphoric acid (conc. of 85%) |
| | Amount of curing agent per 100 parts of solid content of precondensate (part) | 8.5 | 8.5 |
| Foaming agent | Kind | 1,2-dichloro tetrafluoro ethane | 1,2-dichloro tetrafluoro ethane |
| | Amount of foaming agent per 100 grs. of solid content of precondensate (mol) | 0.25 | 0.25 |
| Temperature at which foam cures (°C.) | | 18 | 18 |
| Time for surface-hardening (min.) | | 4 | 4 |
| Density of foam (Kg/m³) | | 19 | 19 |
| Compression strength of foam (Kg/cm²) | | 0.36 | 0.36 |
| When foam was left to stand at relative humidity of 80% at 60° C. for 7 days | State of foam | good | powdered and degraded |
| | Rate of linear shrinkage (%) | 4 | 15 |
| Amount of free formalin in foam (ppm) | | 30 | 50 |
| Increase in weight of | | 2 | 10 |

TABLE 7-continued

|  | Working Example 23 | Comparative Example 22 |
|---|---|---|
| metal plate (mg) Degree of rust | slight rust | rust in whole surface |

WORKING EXAMPLES 24–32 AND COMPARATIVE EXAMPLES 23–28

167 Parts of the solution of precondensate of Preparation 3 (100 parts of solid content of the precondensate), 4 parts of a 20% aqueous solution of sodium lauryl sulfate and each foaming agent in amounts as given in Table 8 was emulsified under a pressure above 1 atm. Each of the resulting emulsions was continuously blended by a mechanical means with a 50% aqueous solution of a modifier and a curing agent as given in Table 8. The resulting solution was depressurized at a foaming temperature as given in Table 5 and charged into a film-clad corrugated box to foam and be cured. The results are shown as Working Examples in Table 8.

For comparison, the procedure of the Working Example was repeated except that no modifier was used. The results are shown Comparative Examples in Table 9.

The amount of foaming agent used was per 100 grs. of solid content of the precondensate for amino resin.

The term "alkyl resorcinol" means derivative of resorcinol having 1–3 alkyl groups of $C_1$–$C_3$ and is sold under the trade name of DFK SAR by Nagoya Oil Chemical Industries Kabushiki Kaisha.

The term "alkyl resorcinol polymer" means a curable resin obtained by reacting an alkyl resorcinol with formaldehyde in the presence of a complexing agent, such as acetone caprolactam and is sold under the trade name of DFK N-9407 (an aqueous solution having solid content of 58–62%) by Nagoya Oil Chemical Industires Kabushiki Kaisha.

TABLE 8

|  | Working Example | | | | | | | | |
|---|---|---|---|---|---|---|---|---|---|
|  | 24 | 25 | 26 | 27 | 28 | 29 | 30 | 31 | 32 |
| Modifier | resorcinol | resorcinol | resorcinol | pyrogallol | alkyl resorcinol | alkyl resorcinol polymer | resorcinol | alkyl resorcinol | resorcinol |
| Amount of modifier per 100 parts of solid content of precondensate (part) | 10 | 20 | 35 | 20 | 20 | 25 | 10 | 20 | 30 |
| Foaming agent | n-butane | 1,2-dichloro tetrafluoro ethane | trichloro fluoro methane | dichloro fluoro methane | 1,2-dichloro tetrafluoro ethane | 1,2-dichloro tetrafluoro ethane | n-butane | 1,2-dichloro tetrafluoro ethane | 1,2-dichloro tetrafluoro ethane |
| Amount of foaming agent per 100 grs. of solid content of precondensate (mol) | 0.18 | 0.96 | 0.38 | 0.10 | 0.66 | 0.24 | 0.18 | 0.24 | 0.38 |
| Curing agent | 85% phosphoric acid | 85% phosphoric acid | 20% sulfonic acid | 10% oxalic acid | 85% phosphoric acid | 85% phosphoric acid | 30% p-toluenesulfonic acid | 30% p-phenolsulfonic acid | 30% p-toluenesulfonic acid |
| Amount of curing agent per 100 parts of precondensate (part) | 16 | 17 | 45 | 40 | 17 | 18 | 18 | 20 | 23 |
| Temperature at which foam cures (°C.) | 18 | 18 | 30 | 18 | 18 | 18 | 18 | 18 | 18 |
| Time for surface hardening (min.) | 3 | 4 | 3 | 3 | 4 | 3 | 3 | 3 | 3 |
| Density of foam (Kg/m$^3$) | 28.7 | 6.0 | 16.5 | 54.0 | 9.0 | 22.0 | 28.5 | 23.0 | 16.3 |
| Efficiency of foam (%) | 95.1 | 93.0 | 96.1 | 99.2 | 90.2 | 97.2 | 95.8 | 97.0 | 97.5 |
| Compression strength of foam (Kg/cm$^2$) | 0.80 | 0.10 | 0.55 | 1.30 | 0.25 | 0.60 | 0.85 | 0.65 | 0.55 |
| Linear shrinkage rate one month after foaming (%) | 0 | 0 | 0 | 0 | 0 | 0 | 0 | 0 | 0 |
| Linear | 0.1 | 0.2 | 0.1 | 0 | 0 | 0 | 0.1 | 0 | 0 |

TABLE 8-continued

| | Working Example | | | | | | | | |
|---|---|---|---|---|---|---|---|---|---|
| | 24 | 25 | 26 | 27 | 28 | 29 | 30 | 31 | 32 |
| shrinkage rate after left to stand in a field for a year (%) | | | | | | | | | |
| Appearance after left to stand in a field for a year | good | good | good | good | good | good | good | good | good |
| Rate of linear shrinkage when foam was left to stand at 60° C. at relative humidity of 80% for 7 days (%) | 2.3 | 2.8 | 2.5 | 2.3 | 2.8 | 2.3 | 2.0 | 2.1 | 2.0 |
| Amount of free formalin in foam (ppm) | 10 | 3 | less than 2 | 5 | 5 | 8 | 9 | less than 2 | less than 2 |
| Increase in weight of metal plate as mentioned in Working Examples 17-22 | — | — | — | — | — | — | 3 | 2 | 2 |
| Degree of rust | — | — | — | — | — | — | slight rust | slight rust | slight rust |

TABLE 9

| | Comparative Example | | | | | |
|---|---|---|---|---|---|---|
| | 23 | 24 | 25 | 26 | 27 | 28 |
| Foaming agent | n-butane | 1,2-dichloro-tetrafluoro ethane | trichloro fluoro methane | dichloro fluoro methane | 1,2-dichloro-tetrafluoro ethane | 1,2-dichloro-tetrafluoro ethane |
| Amount of foaming agent per 100 grs. of precondensate (mol) | 0.18 | 0.96 | 0.38 | 0.10 | 0.66 | 0.24 |
| Curing agent | 85% phosphoric acid | 85% phosphoric acid | 20% sulfamic acid | 10% oxalic acid | 85% phosphoric acid | 85% phosphoric acid |
| Amount of curing agent per 100 parts of precondensate | 16 | 17 | 45 | 40 | 17 | 18 |
| Temperature at which foam cures (°C.) | 18 | 18 | 30 | 10 | 18 | 18 |
| Time for surface hardening (min.) | 3 | 4 | 3 | 3 | 4 | 3 |
| Density of foam (Kg/m$^3$) | 26.5 | 15.0 | 15.5 | 45.5 | 15.0 | 19.5 |
| Efficiency of foam (%) | 93.6 | 31.0 | 75.8 | 98.1 | 45.1 | 95.4 |
| Compression strength of foam (Kg/cm$^2$) | 0.40 | 0.05 | 0.08 | 0.60 | 0.08 | 0.20 |
| Linear shrinkage rate one month after foaming (%) | 4.5 | 7.0 | 7.7 | 3.0 | 7.9 | 7.5 |
| Linear shrinkage rate after left to stand in a field for a year (%) | 12.0 | 16.5 | 14.5 | 9.5 | 15.0 | 15.5 |
| Appearance | | | powdered and degraded | | | |

TABLE 9-continued

| | Comparative Example | | | | | |
|---|---|---|---|---|---|---|
| | 23 | 24 | 25 | 26 | 27 | 28 |
| after left to stand in a field for a year | | | | | | |
| Rate of linear shrinkage when foam was left to stand at 60° C. at relative humidity of 80% for 7 day (%) | 15.0 | 20.0 | 20.0 | 12.0 | 18.0 | 20.0 |
| Amount of free formalin in foam (ppm) | 70 | 65 | 68 | 73 | 65 | 65 |

WORKING EXAMPLE 33 AND COMPARATIVE EXAMPLE 29

182 parts of the solution of precondensate of Preparation 4 (100 parts of solid content of precondensate), 4 parts of a 20% aqueous solution of sodium dodecylbenzene sulfonate and 0.34 mol of 1,2-dichlorotetrafluoroethane (per 100 grs. of solid content of precondensate) was blended and emulsified at 18° C. at a pressure above 1 atm. The resulting emulsion was continuously blended by a mechanical means with 30 parts of 50% aqueous solution of resorcinol and 13 parts of an 85% aqueous solution of phosphoric acid. The resulting solution was depressurized at a foaming temperature as given in Table 10 and charged into a film-clad corrugated box to foam and be cured. The results are shown in Table 10.

For comparison, the procedure of the above Working Example was repeated except that no resorcinol was used. The results are shown as Comparative Example 29 in Table 100.

TABLE 10

| | Working Example 33 | Comparative Example 29 |
|---|---|---|
| Density of foam (Kg/m³) | 16.0 | 15.0 |
| Compression strength of foam (Kg/cm²) | 0.55 | 0.15 |
| Linear shrinkage rate one month after foaming (%) | 0 | 8.5 |
| Linear shrinkage rate after left to stand in a field for a year (%) | 0.2 | 15.5 |
| Appearance after left to stand in a field for a year | good | powdered and degraded |
| Rate of linear shrinkage when foam was left to stand at 80° C. at relative humidity of 80% for 7 days (%) | 3.0 | 15.0 |
| Amount of free formalin in foam (ppm) | 6 | 60 |

What is claimed is:

1. A process for producing amine formaldehyde resin foam by using a precondensate for the amine formaldehyde resin, foaming agent, a surfactant and a curing agent, characterized in that the foaming agent is selected from the group consisting of aliphatic hydrocarbons, halogenated aliphatic hydrocarbons having a boiling point in the range of from about −30° C. to about 30° C. or mixtures thereof, and the foaming agent being used in amount of from about 0.07 mol to about 1.0 mol per 100 g of solid content of the precondensate for amine formaldehyde resin, and wherein the foaming system further contains at least one modifier selected from the group consisting of a compound represented by the formula:

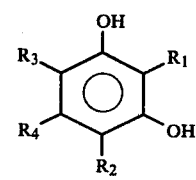

wherein $R_1$, $R_2$ and $R_3$ are independently selected from the group consisting of hydrogen and alkyl having 1–3 carbon atoms, and $R_4$ is selected from the group consisting of hydroxyl, hydrogen and alkyl having 1–3 carbon atoms; mixtures of the compounds of formula I; a condensate of each of the compounds of formula I and formaldehyde; and mixtures of the condensate and the compound of formula I, the process comprising mixing the precondensate, the foaming agent, the modifier and the surfactant under such conditions that the foaming agent is maintained liquid, emulsifying the resulting mixture at a temperature which is at least 0° C. and higher than the boiling point of the foaming agent by 5°–50° C. and at such a pressure that the foaming agent is maintained liquid at said temperature, while or after mixing the resulting emulsified mixture with the curing agent, transferring the resulting mixture to an environment having atmospheric pressure or depressurizing the mixture to atmospheric pressure at a temperature which is between 0° and 35° C. and higher than the boiling point of the foaming agent to foam the mixture.

2. The process as defined in claim 1 wherein at least one aromatic sulfonic acid is used as the curing agent.

3. The process as defined in claim 2 wherein the aromatic sulfonic acid is selected from the group consisting of toluenesulfonic acid, phenolsulfonic acid and mixtures thereof.

4. The process as defined in claim 2 wherein the curing agent is a solution of at least one aromatic sulfonic acid in a solvent selected from the group consisting of water, glycol, glycerin and mixtures thereof.

5. The process as defined in claim 1 wherein the curing agent is used in amount of from about 0.05 parts to about 20 parts by weight per 100 parts of solid content of the precondensate for the amine formaldehyde resin.

6. The process as defined in claim 1 wherein the surfactant is used in amount of from about 0.03 parts to about 7 parts by weight per 100 parts of solid content of the precondensate.

7. The process as defined in claim 1 wherein the foaming agent is selected from the group consisting of L.P.G., dichlorodifluoro methane, 1,2-dichlorotetrafluoro ethane, trichlorofluoro methane and mixtures thereof.

8. The process as defined in claim 1 wherein the modifier is selected from the group consisting of resorcinol, oil shale resorcinol and mixtures thereof.

9. The process as defined in claim 1 wherein the modifier is used in amount of from about 5 to about 40 parts by weight per 100 parts of solid content of the precondensate.

10. A process according to claim 1 effected in the absence of water; and wherein no heating is effected during the foaming step.

* * * * *